(Model.)
J. TAYLOR.
VEHICLE WHEEL.
No. 325,024. Patented Aug. 25, 1885.
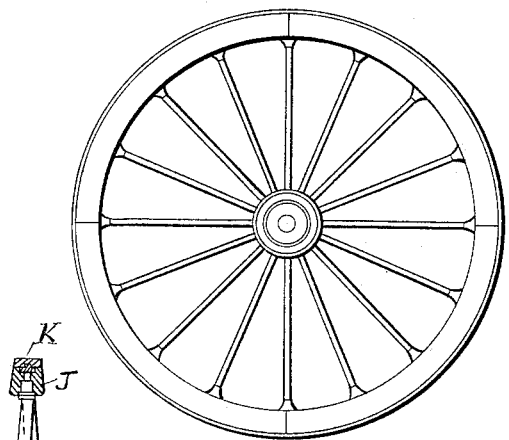
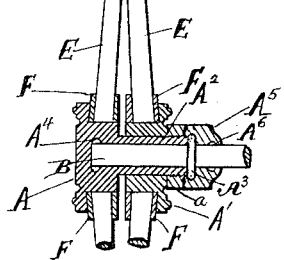
  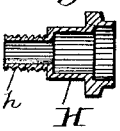 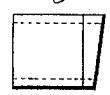
Witnesses.
Robert Everett,
George Tilghman
Inventor.
James Taylor,
By Wm H Babcock,
Atty.

UNITED STATES PATENT OFFICE.

JAMES TAYLOR, OF WIGAN, COUNTY OF LANCASTER, ENGLAND.

VEHICLE-WHEEL.

SPECIFICATION forming part of Letters Patent No. 325,024, dated August 25, 1885.

Application filed March 30, 1883. (Model.) Patented in England March 21, 1882, No. 1,364.

*To all whom it may concern:*

Be it known that I, JAMES TAYLOR, a subject of the Queen of Great Britain, residing at Wigan, in the county of Lancaster and Kingdom of England, have invented certain new and useful Improvements in Wheels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification—that is to say:

This invention relates to wheels for vehicles; and it consists in the construction and combination of parts hereinafter set forth and claimed.

In the annexed drawings, Figure 1 represents a side elevation of a wheel embodying my invention; Fig. 2, a vertical central transverse section of the same, the lower part being omitted; Fig. 3, a transverse section through the tire; Fig. 4, a transverse section through one of the felly-caps; Fig. 5, a longitudinal section through one of the spoke-caps, and Fig. 6 a side elevation of one of the spoke-sockets, the interior being indicated by dotted lines.

The hub or nave of the wheel consists of two sections, A and A', the former being provided with a tubular lateral extension, $A^2$, which passes through a central opening of section A', and is externally screw-threaded beyond the latter. This screw-threaded end receives a nut, which clamps said sections together, and also a second nut, $A^5$, outside of nut $a$, which bears against a collar, $A^3$, on the axle-spindle B, and thus holds said spindle within said hub. Section A is provided with an annular oil-chamber, $A^4$, around the inner end of said spindle, and nut $A^5$ has a similar oil-chamber, $A^6$, around the axle near said collar $A^3$.

The sections A A' are provided with alternately-arranged spoke-sockets F, which receive the inner ends of staggered spokes E, so that the clamping of said sections A A' together, as stated, will tighten said spokes in the felly and tire.

Each spoke is provided on its outer end with a screw-cap, H, having an externally-screw-threaded outward extension, $h$. This takes into an internally-screw-threaded cap, I, which is embedded in the felly J, and provided on its outer end with a transverse rib, I', Fig. 4, which extends beyond said felly. There is one of these caps I for each spoke E and spoke-cap H.

K designates the tire, which is provided with transverse grooves or recesses corresponding to the ribs I', one of said recesses being shown at $k$ in Fig. 3.

While the tire is warm it is fitted on the felly, so that each one of these grooves $k$ will receive one of the ribs I', and as it shrinks it will draw and clamp very tightly upon these ribs, obviating all risk of dislodgment. When the spokes have been screwed into the caps I, and the hub sections A A' drawn together by nut $a$, as described, the wheel as a whole will be firmly bound together, though the parts may be easily detached. The wheel is then attached to the axle by nut $A^5$.

Having thus described my invention, what I claim as new, and desire to secure by Letters Patent, is—

1. A tire, K, having transverse grooves $k$, in combination with a felly, J, and a series of pieces set into said fellies, and provided with ribs I', which fit said transverse grooves, substantially as set forth.

2. A series of spokes each provided on its outer end with a cap, H, having a screw-threaded outer extension, $h$, in combination with caps I, which are set into the felly, and internally screw-threaded to receive said extensions $h$, substantially as set forth.

3. A series of caps, I, which are internally screw-threaded, and provided on their outer ends with projecting transverse ribs I', in combination with the recessed felly J, into which said caps are set, the tire K, having in its inner face the transverse grooves $k$, and the spokes E, which have on their outer ends the caps H, provided with screw-threaded extensions $h$, that take into said caps I, substantially as set forth.

4. The combination of the spokes and spoke-sockets with the hub-sections A A', the two nuts $a$ $A^5$, which screw on the extension $A^2$ of section A, and the axle-spindle B, having collar $A^3$, all substantially as set forth.

In testimony whereof I affix my signature in presence of two witnesses.

JAMES TAYLOR.

Witnesses:
JAMES BROOKWELL,
*Cab Proprietor, 57 Wallgate Street, Wigan.*
MOSES FARNSLEY,
*Chemist and Druggist, 42 Wallgate Street, Wigan.*